Sept. 3, 1940. V. VOSTREZ 2,213,775
PISTON
Filed Feb. 8, 1937

INVENTOR.
Victor Vostrez
BY
ATTORNEY.

Patented Sept. 3, 1940

2,213,775

UNITED STATES PATENT OFFICE 2,213,775

PISTON

Victor Vostrez, Lincoln, Nebr.

Application February 8, 1937, Serial No. 124,700

4 Claims. (Cl. 309—9)

My invention relates to pistons for internal combustion engines and having for one of its objects the provision of a two-piece construction wherein the piston head is supported directly on the piston pin bosses.

Another object of my invention is the provision of a structure wherein the piston skirt carries only the thrust of the connecting rod.

Another object is the provision of a piston structure wherein all power is transferred directly to and through the piston pin bosses.

Another of my objects is the provision of a piston head and skirt so related to each other that the skirt may be fitted much closer to the cylinder wall than in the prior pistons, resulting in quieter operation and longer life of the piston.

Another object which I have in view is the provision of a piston having a head and a skirt of different metals, the metal of the head having greater heat conductivity and lighter weight than the metal of the skirt.

Another object of my invention is the provision of a piston head and skirt which are so united that each is entirely free to expand and contract individually, thus making possible the use of material of lighter weight and insuring greater strength and reduced wear.

Another object is the provision of a piston skirt having its only contact with the piston head at the pin bosses to thus provide better temperature control and avoiding the excessive heating of the upper portion of the piston skirt.

Another of my objects is the provision of an integral piston formed by welding or otherwise uniting the piston head and skirt into a unitary structure.

It is also my object to provide a piston head and skirt which may each be cast or forged without the use of cores or complicated dies.

Having in view these objects and others which will be pointed out in the following description, I will now refer to the drawing, in which Figure 1 is a median vertical sectional view of my piston, the section being in the median plane of the pin bosses.

Figure 1:
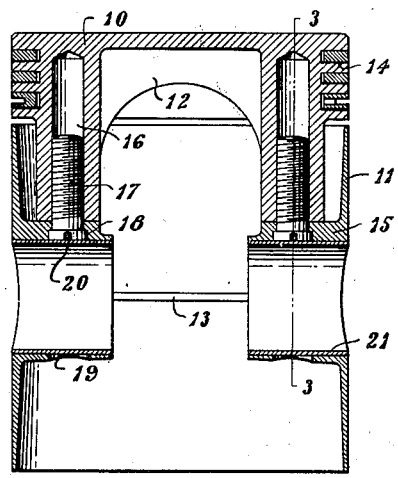

The piston includes a head 10 and a skirt 11 which are provided with ribs 12 and 13 respectively. The head 10 and skirt 11 are each integral with their ribs, being so formed in the casting process. The head 10 is further provided with the usual ring grooves 14. Projecting inwardly from the skirt 11 are two pin bosses 15 which are in alignment with each other and diametrically opposed to each other.

Figures 2, 3:
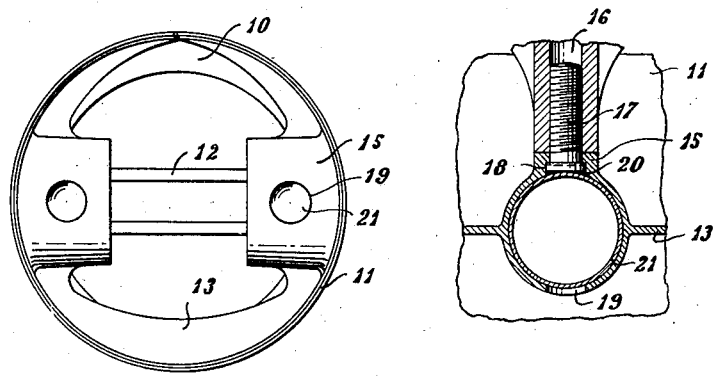
Figure 2 is a bottom plan view of the piston.
Figure 3 is a sectional view on the line 3—3 of Figure 1.

The head 10 rests upon and is supported by the pin bosses 15 to which the head is secured in substantially integral relation. The lower portion of the head 10 is reduced in diameter whereby the head is spaced from and out of direct contact with the skirt, thus reducing the heat transfer to the skirt. This lower portion is also cut away between the areas of engagement with the bosses, as shown in Figure 3, to further decrease the heat transfer from the head to the skirt. The head is provided with a pair of upwardly projecting screw sockets 16 for receiving the cap screws 17. In the pin bosses 15 there are two apertures 18 and 19 in diametric relation and aligned in the pin bosses with respect to the screw threaded sockets 16. The apertures 18 are stepped with the upper portions of substantially the diameter of the sockets 16 and with the lower portions of a diameter to snugly seat the heads of the cap screws 17. The apertures 19 are of a size to permit the passage therethrough of the heads of the cap screws 17.

In assembling the parts, the head and skirt are held together with the apertures 18 and 19 in alignment with the sockets and they are then secured together in this position. The cap screws 17 are inserted through the apertures 19 and driven into the sockets 16. In order to make continuous the inner surfaces of the pin bosses, the heads of the screws 17 may be welded or brazed at 20 to not only provide continuous surfaces but to unite the head and skirt in integral relation. If perfectly smooth surfaces are desired, the surfaces of the pin sockets may be machined. As the final step in the assemblage of the piston, the bushings 21 are driven into the pin sockets of the pin bosses.

In the above described piston, the head has no contact with the skirt except at the piston pin bosses which constitute the sole support for the head. This construction distinguishes over those prior constructions in which the head rests on a continuous annular shoulder. With my construction I am enabled to use aluminum or an aluminum alloy for the head and to employ steel or an iron alloy for the skirt and to thus obtain all of the advantages of a head of light weight and great heat transfer without the disadvantages due to the difficulties resulting from the great difference in the coefficients of expansion. The skirt is preferably made from steel or an iron alloy because of the superior wearing qualities of these metals.

My piston has advantages also in their manufacture and assembly. The head and skirt are each of simple design which adapts itself readily to the casting process, requiring no complicated dies or molds and requiring the minimum of machining. In the finished product the cap screws are entirely concealed and firmly secured in place without objectionable projections from any of the smooth surfaces of the piston. This is due largely to the alignment of the socket 16 with the apertures 18 and 19 whereby the cap screw may be introduced through the aperture 19. to be seated in the aperture 18 and the socket 16.

Having thus described my invention in such full, clear and exact terms that its construction and utility will be readily understood by others skilled in the art to which it pertains, what I claim as new and desire to secure by Letters Patent of the United States is:

1. A piston, comprising a skirt having integral opposed inwardly extending pin bosses disposed intermediate the upper and lower ends of the skirt, a head having an upper ring-grooved portion of substantially the exterior diameter of the skirt and having a lower portion of a maximum transverse dimension less than the interior diameter of the upper end of the skirt and extending downwardly into the latter in spaced relation to the same and seated upon the upper portions of the bosses to support the head directly from the bosses and in spaced relation to all other parts of the skirt, said head being formed of a metal having a higher heat conductivity and lighter weight than the metal of which the skirt is formed, and securing means between the upper portions of the bosses and the lower portion of the head for securing the head to the skirt.

2. A piston, comprising a skirt having integral opposed bosses extending inwardly toward each other with their axes in a plane intermediate the top and bottom of the skirt, said bosses having vertically alining openings in the upper and lower walls thereof, a head having a ring carrying portion at its upper end and having a reduced lower portion extending in spaced relation into the upper end of the skirt and seated at its lower extremity upon the upper walls of the bosses, said lower portion of the head having threaded bores therein registering with said openings in the bosses, and screws secured upwardly through the upper walls of the bosses and into said bores of the lower portion of the head for securing the head to the skirt.

3. A piston comprising a skirt having integral opposed inwardly extending pin bosses, a head having an upper ring-grooved portion of substantially the exterior diameter of the skirt and a lower portion seated upon the upper portions of said bosses to support the head directly from the bosses, said head being provided with a plurality of screw threaded sockets projected upwardly therein and said pin bosses being provided with apertures in alignment with the sockets of said head, screws passing through the apertures of said pin bosses and into the sockets of said head, and bushings in the pin sockets of said pin bosses and covering the heads of said screws.

4. A piston comprising a skirt having integral opposed bosses extending inwardly toward each other with their axes in a plane intermediate the top and bottom of the skirt, said bosses having openings in the upper walls thereof, a head having a ring carrying portion at its upper end and having a reduced lower portion extending in spaced relation into the upper end of the skirt and seated at its lower extremity only upon the upper walls of the bosses, said lower portion of the head having threaded bores registering with said openings in the bosses, screws secured upwardly through the upper walls of the bosses and into said threaded bores of the head for securing the head to the skirt, and bushings in the pin sockets of said pin bosses and covering the heads of said screws.

VICTOR VOSTREZ.